United States Patent [19]

Yuge

[11] Patent Number: 4,825,378

[45] Date of Patent: Apr. 25, 1989

[54] BUNDLER INCLUDING BILL HANDLING SYSTEM WHICH KEEPS TRACK OF UNBUNDLED BILLS

[75] Inventor: Akio Yuge, Kanagawa, Japan

[73] Assignee: Kabushiki Kaisha Toshiba, Kawasaki, Japan

[21] Appl. No.: 62,600

[22] Filed: Jun. 16, 1987

[30] Foreign Application Priority Data

Jun. 17, 1986 [JP] Japan ................................ 61-140943

[51] Int. Cl.⁴ .......................... G06F 15/20; B07C 5/34

[52] U.S. Cl. ...................................... 364/478; 53/501; 209/534; 209/551

[58] Field of Search ................ 364/478; 209/534, 551; 53/494, 495, 501

[56] References Cited

U.S. PATENT DOCUMENTS 3,932,272 1/1976 Carnes, Jr. et al. ................. 209/534
4,025,420 5/1977 Horino ................................ 209/534
4,681,229 7/1987 Vesaka et al. .................. 209/551 X
4,690,268 9/1987 Ueshin ................................ 198/399
4,694,963 9/1987 Takesako ........................ 235/379 X
4,709,914 12/1987 Taylor ............................ 209/534 X

FOREIGN PATENT DOCUMENTS 60-242167 12/1985 Japan .
61-23074 1/1986 Japan .

*Primary Examiner*—Joseph Ruggiero
*Attorney, Agent, or Firm*—Cushman, Darby & Cushman

[57] ABSTRACT

A bill handling system provided with a bill bundler unit for sorting bills according to denominations, counting the sorted bills for each denomination and bundling bills of a predetermined number and a predetermined denomination, the number of bills remaining unbundled being counted and stored when bill sorting and counting operations have been completed, so as to continually implement the succeeding bill bundling operation on the basis of the stored number of bills remaining unbundled. The number of remaining bills is displayed or printed for calling an operator's attention to the number of remaining files.

6 Claims, 13 Drawing Sheets

BILL SORTER / BUNDLER

BUNDLER INCLUDING BILL HANDLING SYSTEM WHICH KEEPS TRACK OF UNBUNDLED BILLS

BACKGROUND OF THE INVENTION

1. Field of the Invention

The present invention relates to a bundler including a bill handling system for sorting various bills of different denominations, counting the number of sorted bills into a bundle. As used in this application bill implies various kinds of valuable sheets such as paper moneys, securities, merchandise coupons, checks, etc.

2. Description of the Prior Art

Recently, a sorter having a bill handling machine for sorting bills of different denominations and counting the sorted bills has become widely used. In addition, bill bundlers for bundling bills of the same denomination 100 sheets by 100 sheets, for instance, have been put into practical use.

As a natural consequence, sorters having bill handling machines provided with a bill bundling function also have been developed. In these bundler including bill handling machines, various bills inserted into the machine are arranged (e.g. counterfeit bill check, bill face arrangement, bill fitness (damage) check), sorted into bills of the same denomination, counted for each group of sorted bills, verified on the basis of deposit slips, accommodated in a safe for each sorted denomination, and bundled into bundles of a predetermined number of the same bills. Further, some information such as bank name, deposit transaction date, etc. is stamped on a tape for bundling a predetermined number of bills, in order to assure, confirm, and clarify the responsibility of the number of bills.

These bundlers including bill handling machines are very convenient, because sorting, counting and bundling of bills can be effected at a high speed as compared with when these operations are effected separately.

In the conventional bundler including a bill handling machine, however, there exists the following problem: when one deposit transaction is completed before bills of the same denomination to be bundled reach a predetermined number (e.g. 100 bills), the remaining bills less than a predetermined number should be removed manually from the machine before starting the succeeding deposit transaction. This manual preliminary operation (removal of remaining bills) is not preferable from the standpoint of precision and efficiency. Therefore, there exists a demand for enabling the succeeding transaction to operate automatically, without manually removing bills remaining in the bill handling machine.

SUMMARY OF THE INVENTION

With these problems in mind, therefore, it is the primary object of the present invention to provide a bundler including a bill handling system which can handle bills of the same denomination automatically and continuously without being subjected to the influence of the presence or absence of bills remaining unbundled in the preceding operation.

To achieve the above-mentioned object, a bundler including a bill handling system for sorting bills according to denominations, counting the sorted bills for each denomination and bundling bills of a predetermined number and a predetermined denomination, according to the present invention comprises: (a) means for detecting an end of the bill sorting and counting operation; (b) means for detecting the number of bills remaining unbundled when the detecting means detects an end of the bill sorting and counting operation; and (c) means for storing the number of bills remaining unbundled for continually implementing the succeeding bill bundling operation on the basis of the stored number of bills remaining unbundled.

Further, it is preferable to display and/or print the number of bills remaining unbundled to be called to the operator's attention.

Further, to achieve the above-mentioned object, the method of continually bundling bills of a predetermined number of the same denomination in a bundler including a bill handling system for sorting bills according to denominations and counting the sorted bills for each denomination, according to the present invention comprises the following steps of: (a) designating a denomination of bills to be bundled; (b) checking whether the designated bill denomination is the same as that of a preceding bill bundling operation; (c) if not the same, checking whether bills remain unbundled; (d) if bills remain unbundled, manually removing the remaining bills; (e) if the same or if not the same and no bills remain unbundled, sorting and counting bills inputted into the system; (f) storing the number of bills for each denomination into a memory unit; (g) determining a predetermined number of bills to be bundled; (h) bundling bills of the predetermined number and the designated denomination; (i) checking an end of bill sorting and counting operation and outputting an operation end signal; (j) displaying sorted and counted results of each denomination in response to an operation end signal; (k) displaying and printing the number of bills remaining unbundled; and (l) storing the sum total into the memory unit.

BRIEF DESCRIPTION OF THE DRAWINGS

The features and advantages of the bundler including a bill handling system according to the present invention will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENTS

The bundler including a bill handling system according to the present invention will be described hereinbelow in detail with reference to the attached drawings.

A bundler including a bill handling system of the present invention sorts bills of various denominations, counts sorted bills and bundles sorted and counted bills of a predetermined denomination. The system of the present invention further comprises count-end detecting means 201 for detecting an end of bill assortment and counting, remaining bill detecting means 203 for detecting the number of bills of a predetermined denomination remaining unbundled when a count-end has been detected, and remaining bill handling means 205 for handling the detected number of the remaining bills. Therefore, the succeeding assortment and counting operation are implemented under consideration of the number of remaining bills.

Figure 1:
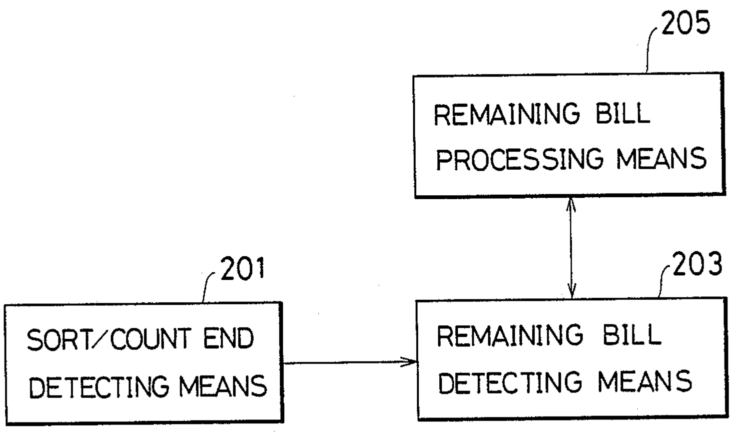
FIG. 1 is a schematic block diagram showing only the essential sections of the system according to the present invention.
Figure 2:
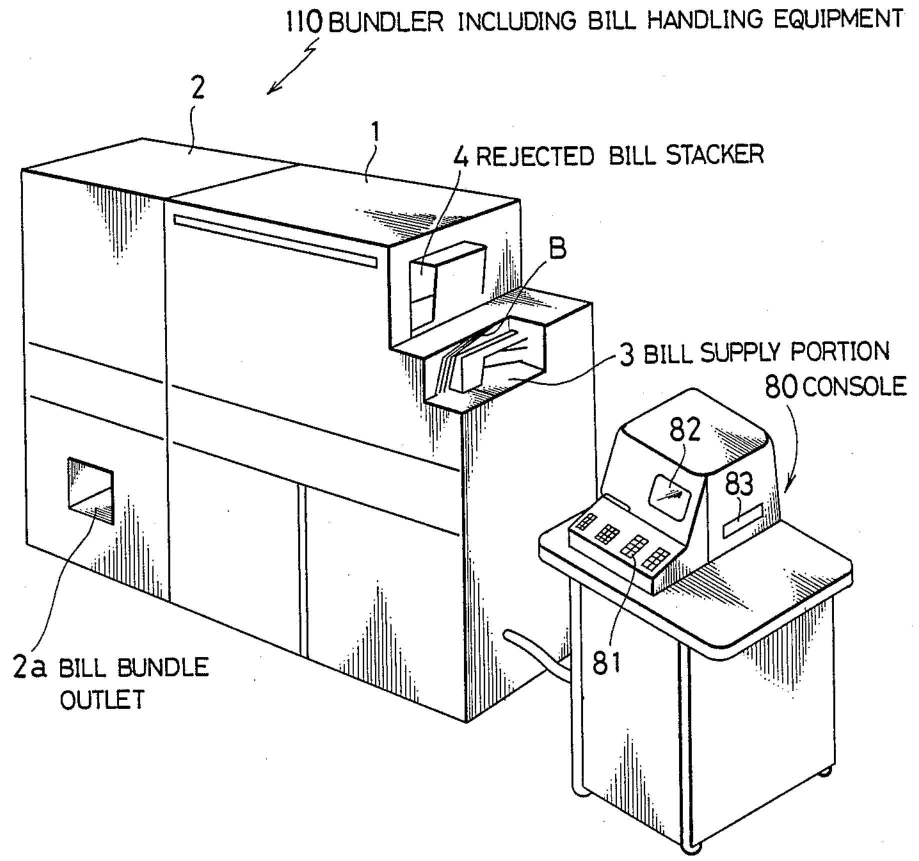
FIG. 2 is a perspective view showing an appearance of a bundler including a bill handling system according to the present invention.

FIG. 2 shows an entire system of the present invention, which can be divided into bill handling equipment 110 including a bill bundler, and a console unit 80. The console unit 80 includes a control board 81, a cathode-ray tube (CRT) display unit 82 and a printer 83. The bundler including bill handling equipment 110 includes a bill bundler unit 2, a bill bundler outlet 2*a*, a bill supplying portion 3 and a rejected bill stacker 4.

Figure 3:
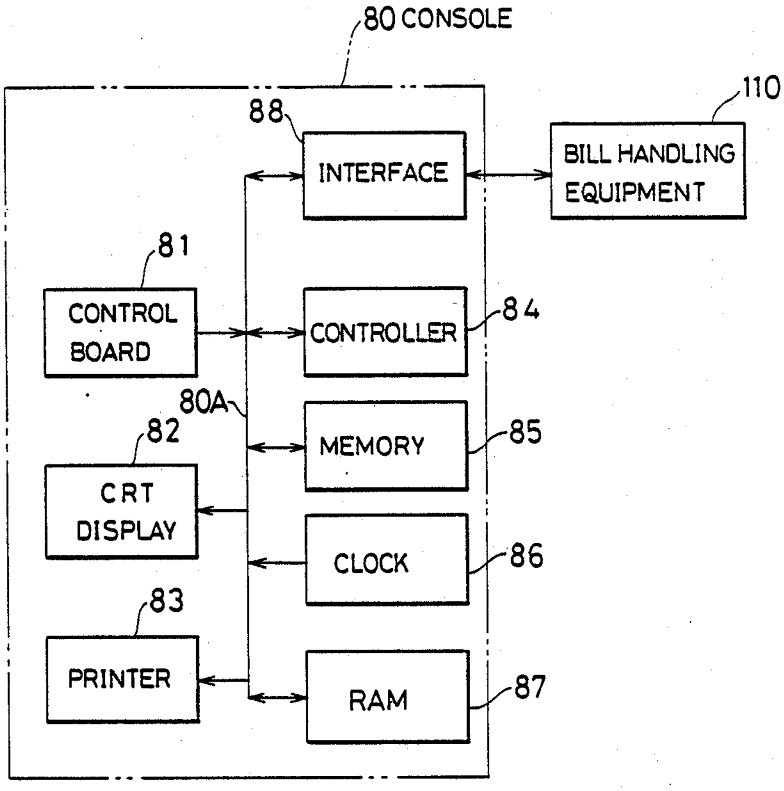
FIG. 3 is a schematic block diagram of the bill handling system shown in FIG. 2.

As shown in FIG. 3, these units 81, 82 and 83 are connected to various sections such as a controller 84 for controlling the entire operations, a memory unit 85, a clock unit 86, and a RAM 87 through buses 80A in the console unit 80. Further, the console unit 80 is connected to the bill handling equipment 110 via an interface 88 for transmitting and receiving various data therebetween.

Figure 4:
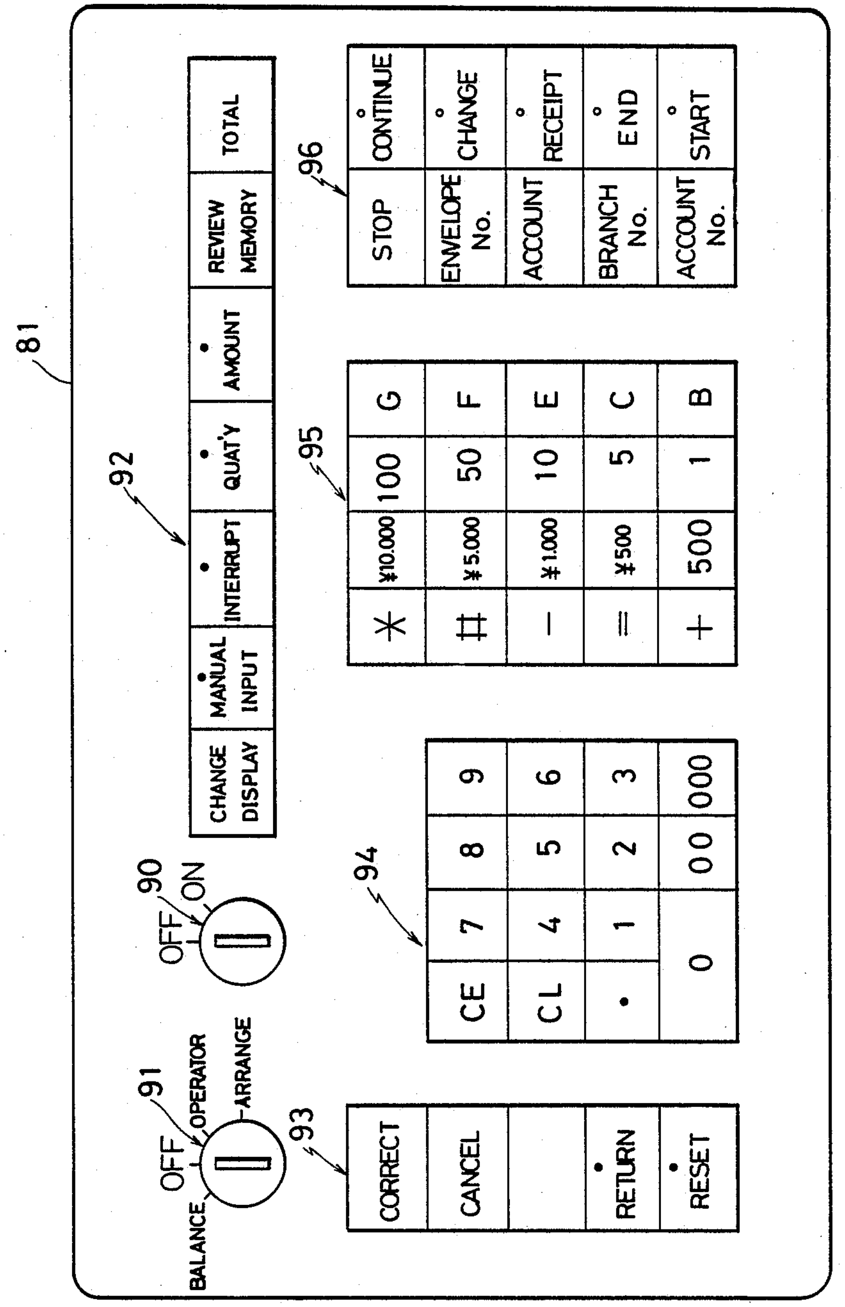
FIG. 4 is a view showing a keyboard of the system according to the present invention.

FIG. 4 shows an exemplary arrangement of the control board 81, which includes a power ON-OFF switch 90, a mode selector switch 91, a first key group 92, a second key group 93, a ten key group 94, a denomination key group 95, and a third key group 96.

The mode selector switch 91 can be set to any one of operator (deposit) mode, bill arrange mode (for counterfeit bill rejection, bill face arrangement, bill fitness (damage) check) and balance mode (for obtaining a balance of each deposit transaction).

The first key group 92 includes a display change key, a manual input key for manually inputting the number of some rejected bills, an interrup key, a quantity key for entering the number of bills manually sorted, an amount key for entering the amount of money recorded in a slip, a review memory key for displaying the number of sorted bills, and a sum total key for indicating a sum total of the handled bills.

The second key group 93 includes a correct key, a cancel key, a return key, a reset key, etc. The ten key group 94 includes ten numeral keys, a clear key, an entry clear key, etc. The bill denomination key group 95 includes a mode selection key *, an operator number key #, three calculation keys −, = and +, bill keys (¥10,000, 5,000, 1,000, 500), coin selector key ¥100, 50, 10, 5, 1), and check selector keys (B to G). The third key group 96 includes a stop key, a subnumber (envelope No.) key, an account designation key (current account, fixed account), a bank branch number key, an account number key, a continue key, a change key, a receipt issue key, a completion key, and a start key. Further, the above first and third key groups have an illumination key.

As noted with respect to FIG. 2, the bill handling equipment 110 includes the sorter/counter body 1 having the bill supplying portion 3 and the rejected bill stacker 4, and the bundler body 2 having the bill bundle outlet 2*a*. In more detail, with reference to FIG. 5, a bill feeding device 5 is disposed within the body 1 so as to face the bill supplying portion 3, so that bills B (mediums) arranged in the bill supplying portion 3 can be taken up one by one and fed into a bill discriminating device 7 through a feeding path 6 to discriminate bill denomination, bill genuineness or imitation, bill fitness (damage), facing and orientation. If a bill is determined to be abnormal by this bill discriminating device 7, the bill is conveyed to the bill reject stacker 4, while if normal, the bill B is guided on the left side in FIG. 5 via a first distribution gate 8*a*.

Further, a bill B determined to be on the right (correct) side is guided to a convey path 9, while a bill B determined to be on the reverse side is guided through a second distribution gate 8*b* to the second convey path 11 (viz. a twist convey path) to turn the bill face up. Further, since the bill pass time is the same in both the first convey path 9 and the second (turnover) convey path 11, even if the bills B are distributed through the second distribution gate 8*b* into two different convey paths 9 and 11, bills can be conveyed at a constant pitch passing through a confluent point 12 without bill collision or jamming.

A specified denomination of bills designated by the control board are guided by a third distribution gate 10 to a bundle convey path 18, while other denominations of bills not designated are guided to a sort convey path 13 and sorted into each denomination of bills. Under the sort convey path 13, there are arranged a plurality of temporary bill storage sections 14*a* to 14*d* for temporarily stacking bills sorted according to the denomination of bills in order and a plurality of shutter devices 16 for supporting the bills stacked one upon the other in the temporary storage section and for dropping the stacked bills into each bill safe 15*a* to 15*d* only when the amount of bills stacked within all the temporary storage sections matches the content on a corresponding deposit slip. Further, the numeral 17 denotes bill weights for securely putting the bills stacked within each temporary storage section 14 into each bill safe 15.

The above-mentioned bundler including bill handling equipment has already been disclosed in Japanese Patent Application No. 57-209693, corresponding to U.S. Pat. No. 4,690,268, which is incorporated herein by reference.

Figure 5:
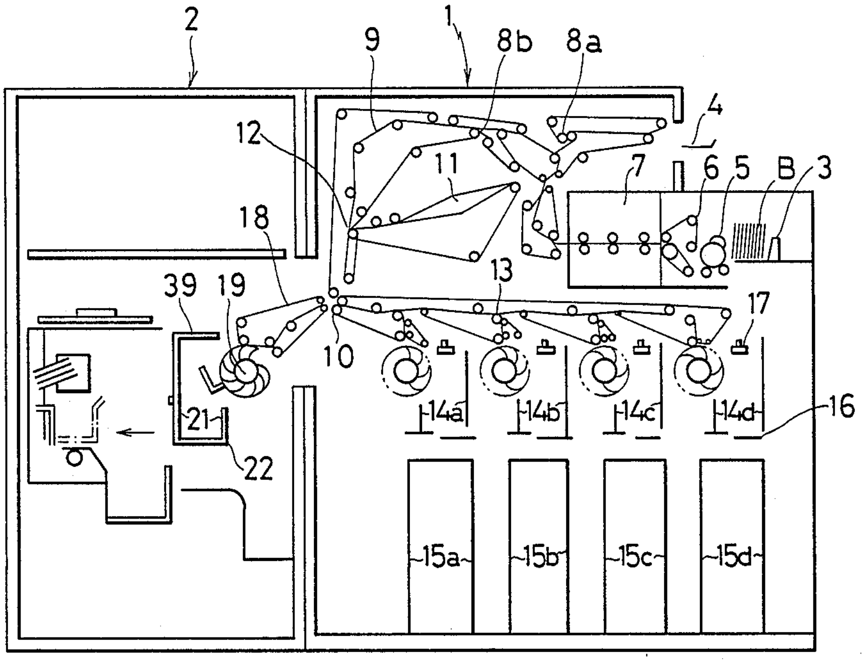
FIG. 5 is a diagrammatical cross-sectional view showing a bill sorter and a bill bundler of the system according to the present invention.

Bills of a specified denomination designated by the control board 81 are guided to the bundler convey path 18 through the distribution gate 10, as shown in FIG. 5.

The bill bundling device 2 now will be described in detail below.

Figure 6:
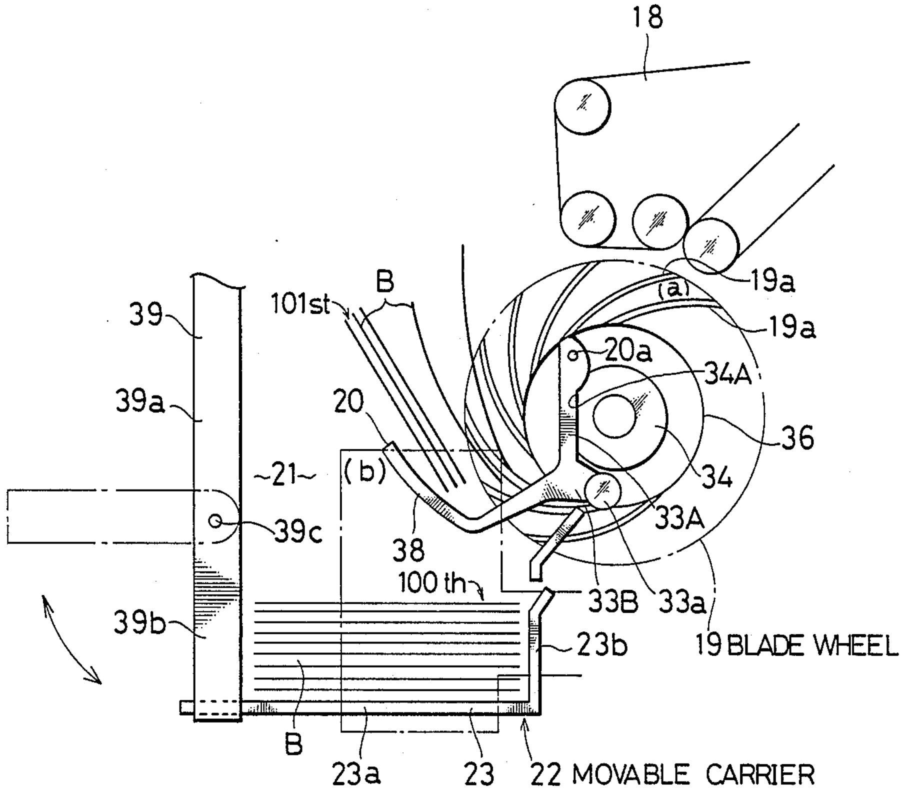
FIG. 6 is a diagrammatical side view showing a bill sorting and stacking device incorporated in the system according to the present invention.

In FIG. 6, the numeral 19 denotes a blade wheel, which receives bills B of a predetermined number (e.g. 100 bills) conveyed through the bundler convey path 18 in sequence within a space formed between two blades. The blade wheel 19 is made up of a coupling wheel 36 rotatably supported by a separator shaft 34 via bearings 35 and a number of blades 19a fixed to the coupling wheel 36 (all shown in FIG. 7) so as to extend in spiral fashion in the radial direction thereof. This blade wheel is rotated counterclockwise at a constant speed by a motor (not shown) via a spur gear 36a formed in the coupling wheel 36.

The numeral 20 denotes a pair of rotatable lever separators pivotably disposed on both side surfaces of the blade wheel 19. The separator 20 includes a long lever 33A, a short lever 33B and a hook-shaped bill support lever 38. The long lever 33A is pivotably supported by a pin 20a fixed to a separator support body 37 (shown in FIG. 7) fixed to the separator shaft 34; a roller 33a is provided for the short lever 33B; and the separator 20 is urged by a spring (not shown) in such a direction as to engage with the cutout portion 34A of the separator shaft 34. Therefore, when 100 sheets of bills are received within a space formed between two blades, the blade wheel 19 rotates counterclockwise in FIG. 6 so that 100 bills are shifted and received by the hook-shaped lever 38 within a stacking chamber 21 and further stacked on a movable bill carrier 22. A more detailed description of the separator is made in Japanese published unexamined (Kokai) Patent Application No. 60-242167.

Figure 7:
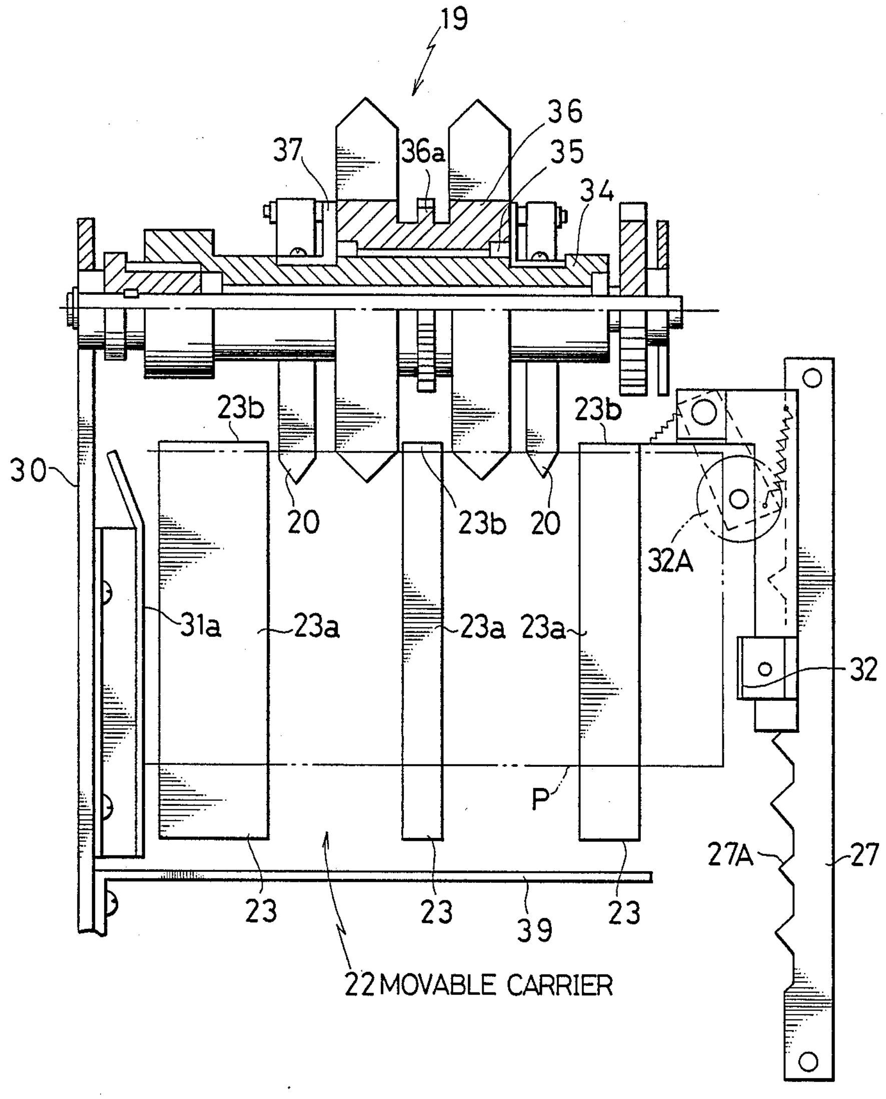
FIG. 7 is a diagrammatical top view showing the bill stacking device including a bill end arranging device.
Figure 8:
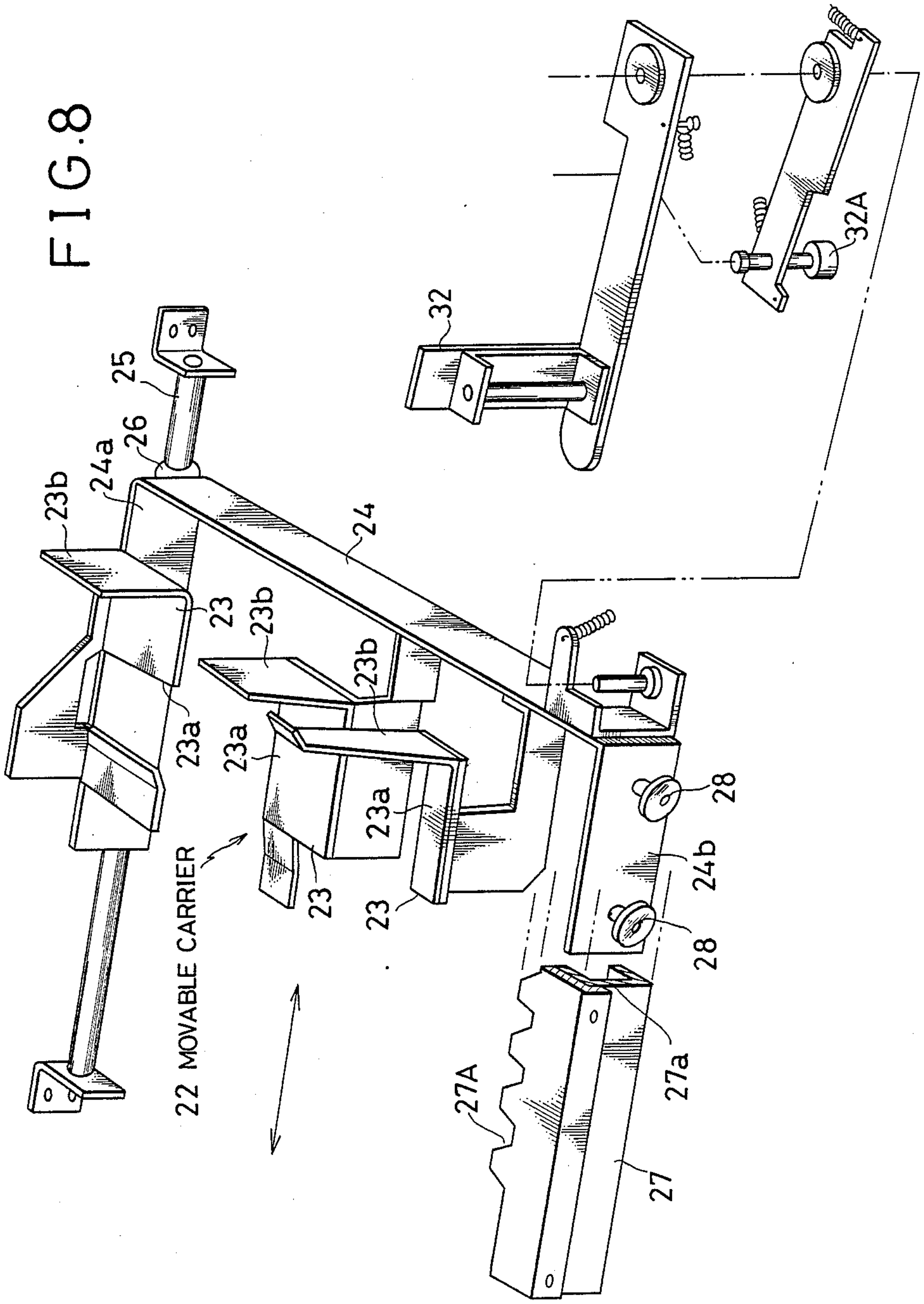
FIG. 8 is a perspective view showing the bill stacking device shown in FIGS. 7 and 8.

At the bottom of the stacking chamber 21 shown in FIG. 6, the movable bill carrier 22 is disposed to move a designated number (e.g. 100 bills) of bills B to the succeeding bundling step. As shown in FIGS. 6, 7 and 8, the movable carrier 22 is composed of three L-shaped members 23 each having a horizontal support portion 23a and a vertical support portion 23b, being fixed to a movable frame 24 as shown in FIG. 8. One side frame 24a of this movable frame 24 is provided with a bearing cylinder 26 so as to be slidable along a guide shaft 25, while the other side frame 24b thereof is provided with two guide rollers 28 so as to be rotatable along a guide groove 27a of a guide rail 27. This movable carrier 22 is reciprocably moved in the arrow direction shown in FIG. 8 along the guide shaft 25 and the guide rail 27 by a carrier driver 57 shown in FIG. 10. This carrier driver 57 is composed of a reversible motor 59 fixed to the side frame 30, a drive sprocket 58A driven by the motor 59, an idler sprocket 58B rotatably mounted on the side frame 30, an endless chain 61 reeved between the two sprockets 58A and 58B, an engage roller 61a (shown in FIG. 9) mounted at an intermediate position of this chain 61, and a carrier bracket 62 (shown in FIG. 9) formed with a cutout 62a engageable with the roller 61a. The carrier bracket 62 is fixed to an appropriate lower surface of the movable carrier 22. Therefore, when the engage roller 61a is engaged with the cutout 62a of the carrier bracket 62, the movable carrier 22 is moved horizontally in the leftward direction in FIG. 9.

As depicted in FIG. 7, since the two separators 20 are moved passing through spaces formed between two L-shaped members 23, one lateral end of bills introduced into the stacking chamber 21 are brought into contact with the vertical carrier supports 23b so as to be arranged in order. Further, the longitudinal side of the bills are arranged in order by a reference surface 31a (FIG. 7) fixed to the side frame 30 and an arrange plate member 32 (FIGS. 7 and 8) pivoted when a roller 32A is moved to and fro along a plurality of rack-shaped cams 27A formed in the guide rail 27. This plate member 32 is disclosed in detail also in Japanese published unexamined (Kokai) Patent Application No. 61-23074.

In FIG. 6, bills conveyed in order from the bundle convey path 18 are once received in a space formed between two blades 19a of the blade wheel 19, and introduced into the stacking chamber 21 as the blade wheel 19 rotates, before being stacked on the carrier 22. In more detail, the hook-shaped lever 38 of the separator 20 is kept at a stand-by position (a) near the outlet of the convey path 18 until bills of a predetermined number (e.g. 100 bills) are received within a space formed between two blades 19a. That is, when the last (100th bill) of the predetermined number of bills is passed through the convey path 18 so that a bill sensor 18a (shown in FIG. 9) detects the last bill, the separator 20 rotates together with the blade wheel 19 at a constant speed and stops at a stacking position (b) as depicted in FIG. 6. At this moment, the bills supported by the separator 20 are detected by the sensors 114 (shown in FIG. 9).

On the other hand, bills of a predetermined number stacked on the carrier 22 are fed to the bundling section when the succeeding bills are being supported by the separator 20. Thereafter, the instant the carrier 22 is returned to the home position, the separator 20 begins to rotate to stack the bills temporarily supported by the separator 20 on the carrier 22. The above operations are repeated for each bill of a predetermined number (100 bills).

The guide plate 39 (FIG. 6) positioned on the leftside of the carrier 22 (on the carrier moving direction side) is composed of a fixed guide 39a and a pivotal guide 39b pivotably supported by a pin 39c fixed to the lower end of the fixed guide 39a, as shown in FIG. 6. While the carrier 22 is at a standstill in the stacking chamber, the movable guide 39b is located as shown by the solid lines in FIG. 6; however, before the carrier 22 is moved for the succeeding bundling step, the movable guide 39b is pivoted clockwise or upward as shown dot-dashed lines in FIG. 6 to provide a space through which the carrier 22 can be passed.

Figure 9:
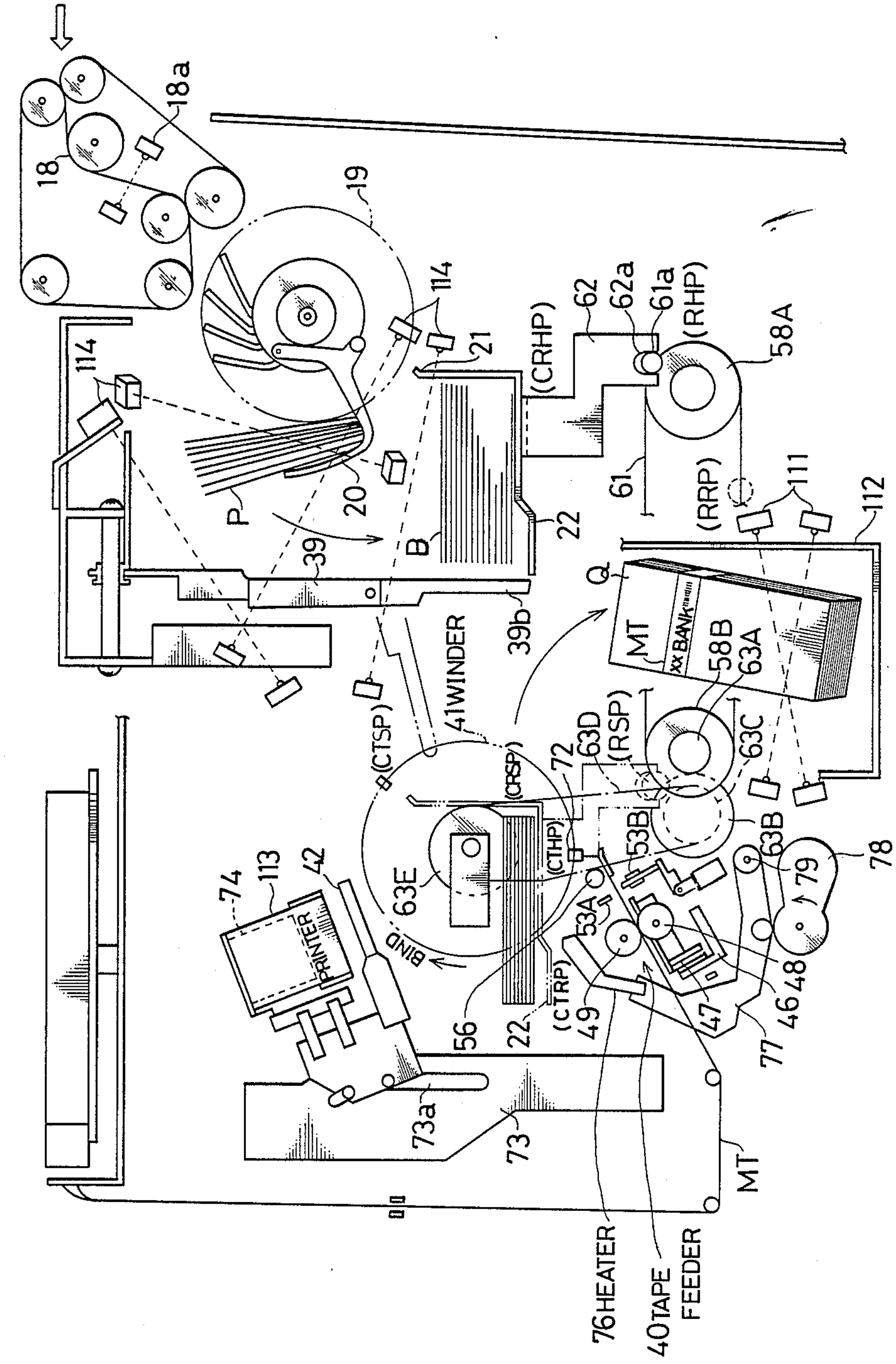
FIG. 9 is a schematic side view of the bill stacking and bundling mechanism of the system according to the present invention for assistance in explaining the operations thereof.
Figure 10:
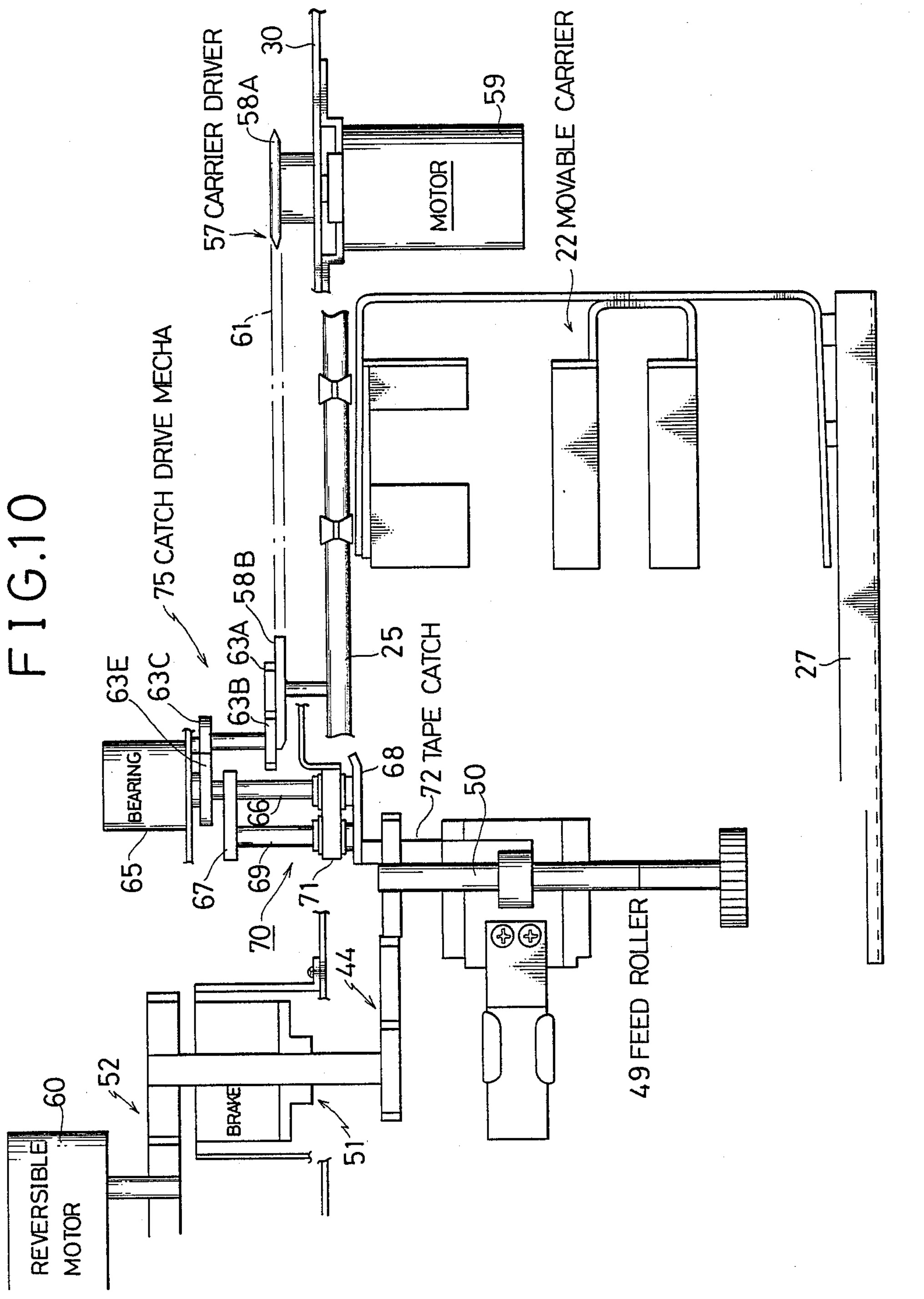
FIG. 10 is a top view showing a power transmit mechanism of the bill bundling device.

With reference to FIGS. 9 and 10, the bundling operation for bundling bills carried by the movable carrier 22 with a strip tape MT will be described. In FIG. 9, the bundling section comprises a tape feeder 40 for supplying a strip tape (e.g. heat-sensitive strip tape coated with a heat melted agent on one side), a winder 41 for winding the strip tape MT supplied from the tape feeder 40 around the bills B carried by the carrier 22, a clamper 42 for compressing the bills wound by the tape, and a heater unit 76 for heating the strip tape MT.

The tape feeder 40 includes a feeder bracket 46 fixed to the side frame 30, a pinch roller holder 47 pivotable relative to the feeder bracket 46, a pinch roller 48 rotatably supported at a free end of the holder 47, and a feed roller 49 fixed to a drive shaft 50 (shown in FIG. 10) so as to be contactable with the pinch roller 48. In FIG. 10, the drive shaft 50 is connected to a feed motor 60 via a gear train 44, a brake unit 51, and another gear train 52. Further, the feed motor 60 is of reversible type, which is rotated in the reverse direction to fasten the strip tape MT wound around bills with a guide roller 56 (shown in FIG. 9), after the tape MT has been wound around the bills.

In FIG. 10, the winder 41 includes a bearing block 65 fixed to the side frame 30, a drive shaft 66 rotatably supported by the bearing block 65, a stop collar 67 fixed to the base portion of the drive shaft 66, a stop plate 68 fixed to the end portion of the drive shaft 66, a guide shaft 69 fixed between the stop collar 67 and the stop plate 68 in parallel to the drive shaft 66, to form a narrow guide 70. Further, a slidable block 71 is fitted to the narrow guide 70, and a tape catch 72 for holding the strip tape MT supplied from the feeder 40 is provided for the slidable block 71.

To drive this tape catch 72 via the drive shaft 66, catch drive mechanism 75 is linked with the carrier driver 57 connected to the motor 59. That is, the catch drive mechanism 75 comprises a first gear 63A rotatable integral with the idle sprocket 58B, a second gear 63B in mesh with the first gear 63A, a first sprocket wheel 63C coaxially rotatable with the second gear 63B, and a second sprocket wheel 63E driven by the first sprocket wheel 63C via a timing belt 63D (shown in FIG. 9) to rotate the drive shaft 66. Since the catch drive mechanism 75 is driven by the drive motor 59 for driving the carrier driver 57, it is possible to drive the carrier 22 and the tape catch 72 in synchronism with each other.

With reference to FIG. 9, the operational timing between the carrier driver and the catch driver will be described hereinbelow. When the carrier 22 is located at a carrier home position (CRHP), the tape catch 72 is located at the catch home position (CTHP) as shown by solid lines in FIG. 9. At this home position, the engage roller 61a is also located at a roller home position (RHP) as shown by solid lines in FIG. 9.

When the carrier 22 is moved to a carrier seal position (CRSP) as shown by dot-dot-dashed lines, the engage roller 61a is moved to the upper periphery of the idle sprocket 58B or at a roller seal position (RSP), and the tape catch 72 is moved to a tape catch seal position (CTSP) (being rotated in the counterclockwise direction). Further, when the engage roller *61a* is moved to a roller reverse position (RRP), the tape catch 72 is moved to a catch reverse position (CTRP) after rotation beyond one revolution. Thereafter, the guide roller 56 is driven clockwise to fasten the loose strip tape around the stacked bills.

Further, while the engage roller *61a* is moved from the roller seal position (RSP) to the roller reverse position (RPP), since the engage roller *61a* is disengaged from the output *62a* formed in the bracket 62 fixed to the carrier 22, only the tape catch 72 is rotated beyond one revolution. When the motor 59 is rotated in the reverse direction and therefore the engage roller *61a* is returned to the roller home position (RHP), the carrier 22 is also returned to the carrier home position (CRHP).

The operation of the bill bundling section of the bill handling machine according to the present invention will now be described hereinbelow.

When a predetermined number of bills are stacked on the carrier 22, the guide plate 39 is pivoted clockwise, as shown by dot-dashed lines in FIG. 6, to allow the bills B to pass under the guide plate 39. Simultaneously, the tape feeder 40 lets out a predetermined length of the heat sensitive strip tape MT at such a position that an end thereof is supported by the tape catch 72.

When the carrier 22 begins to move from the home position (CRHP) to the seal position (CRSP), the tape catch 72 also begins to rotate clockwise in linkage with the carrier 22, and simultaneously the strip tape MT is let out from the feeder 40 to wind the bills around the carrier 22 with the strip tape MT. After the carrier 22 has been stopped at the seal position (CRSP), the tape catch 72 passes the catch seal position (CTSP) and further rotates to the bottom of the carrier 22 or the reverse position (CTRP).

Then, a clamper 42 comes down along a groove 73a formed in a clamp guide 73 together with a printer driver 74 and a printer 113 to press the bills B on the carrier 22 against the L-shaped carrier member 23. Once the clamper 42 pushes the bills B, the reversible motor 60 (FIG. 10) is reversed to rotate the feed roller 49 in the reverse direction, so that the strip tape MT wound around the bills is fed back so as to fasten the bills. Thereafter, the strip tape MT is cut off by two cutters 53A and 53B, and a cam 78 of the heater section rotates to pivot a heater 76 together with a lever 77 about a shaft 79, so that the heater 76 is brought into contact with the strip tape MT at the bottom of the carrier 22 to heat-bond an overlapped end of the strip tape MT. Thereafter, the cam 78 further rotates, so that the lever 77 goes away from the bills B on the carrier 22. Upon heat-bonding of the tape MT, the printer 113 is actuated to print a bank name, date, etc. on the tape MT of a bill bundle Q. After printing, the printer 113 and the clamper 42 are moved out of the rotational radius of the tape catch 72 along the clamper guide 73. Simultaneously, the tape catch 72 is released from the strip tape MT and rotated in the counterclockwise direction by the reversed linear motor 59. In linkage with the rotation of the tape catch 72, the carrier on which a bill bundle Q is mounted begins to move toward the carrier home position (CRHP). At this moment, since the pivotal guide *39b* of the guide member 39 is positioned vertically as depicted by solid lines in FIG. 9, the bill bundle Q on the carrier 22 is brought into contact with the pivotal guide *39b* and dropped into a shoot 112. A pair of bill bundle sensors 111 are provided for the shoot 112 to detect a timing at which the bill bundle Q is dropped into the shoot 112. That is, the sensors check for whether the bill bundle Q stays at the bundling position within a predetermined time interval. A bill bundle Q bundled or sealed by a heat adhesive tape MT slides down along a shoot surface by gravity and is discharged through a bill bundle outlet *2a* of the bundler unit 2 as shown in FIG. 2.

A bundler similar to the above-mentioned bundler unit 2 is disclosed in Japanese Patent Application No. 57-52913. However, it should be noted that this prior-art bundler is used independently for effecting bill bundling work and not available together with the bill handling machine of the present invention.

In summary, in FIGS. 2 and 5, among various denominations of bills inserted through the bill supplying portion 3, only bills of a predetermined denomination are stacked in the stacking chamber 21, stacked on the movable carrier 22, and then fed to the bundling section for making bill bundles. Bills other than the specified denomination are stacked in temporary bill storage sections *14a* and *14d* through the sort convey path 13. Further, only when the amount of the bills matches a receipt slip, sorted and counted bills stacked in the temporary storage sections *14a* to *14d* are automatically dripped and accommodated by the cash safe *15a* to *15d* by actuating the shutter devices 16 in cooperation with weights 17.

Figure 11:
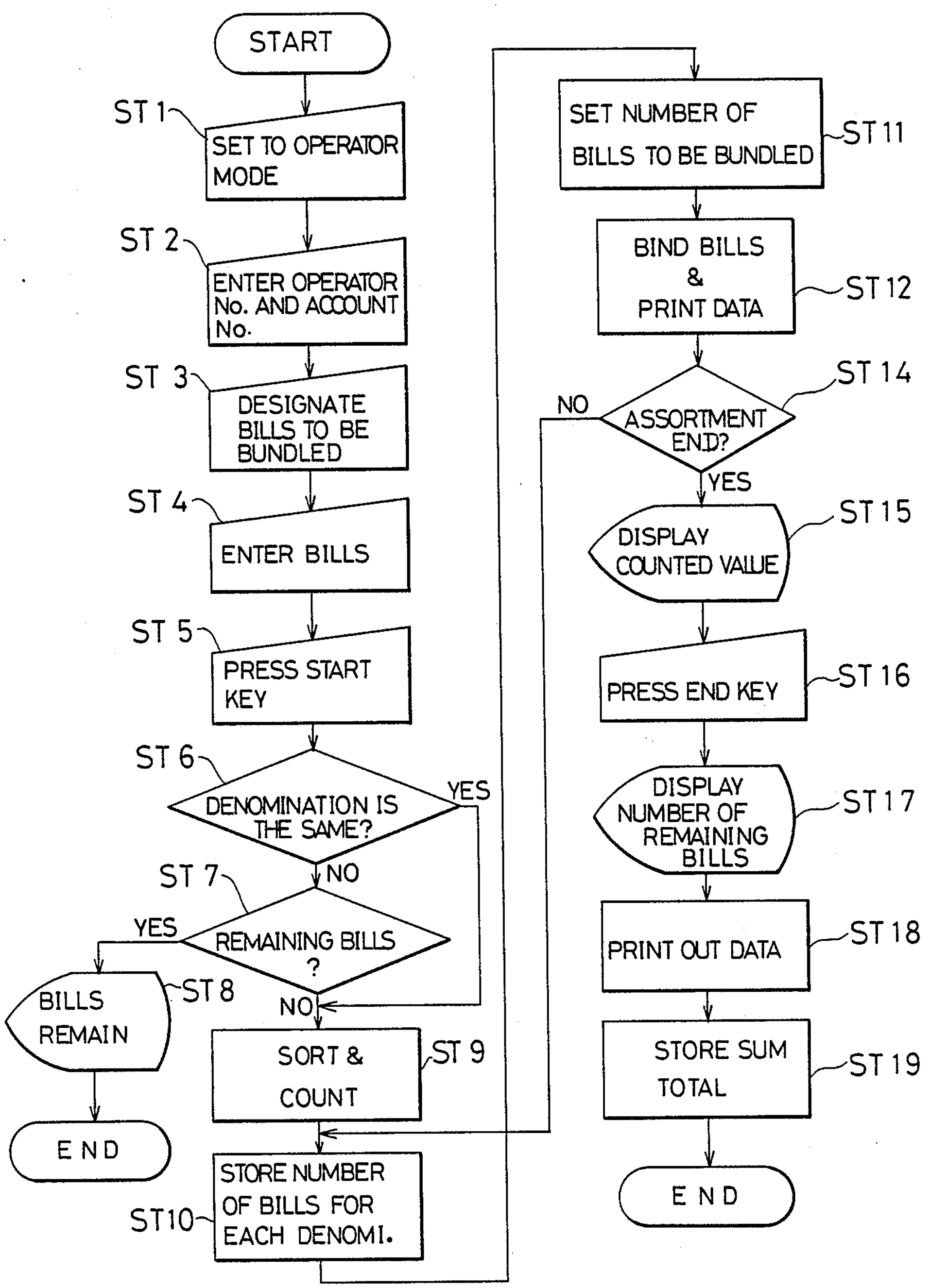
FIG. 11 is a flowchart for assistance in explaining the operation of the system according to the present invention.
Figure 12A:
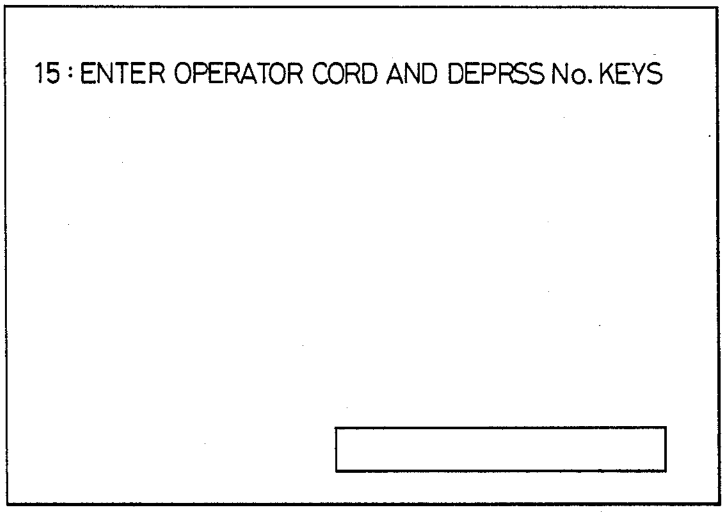
FIGS. 12(A) to 12 (C) are examples of a display indicated on a CRT display unit of the system according to the present invention.
Figure 12B:
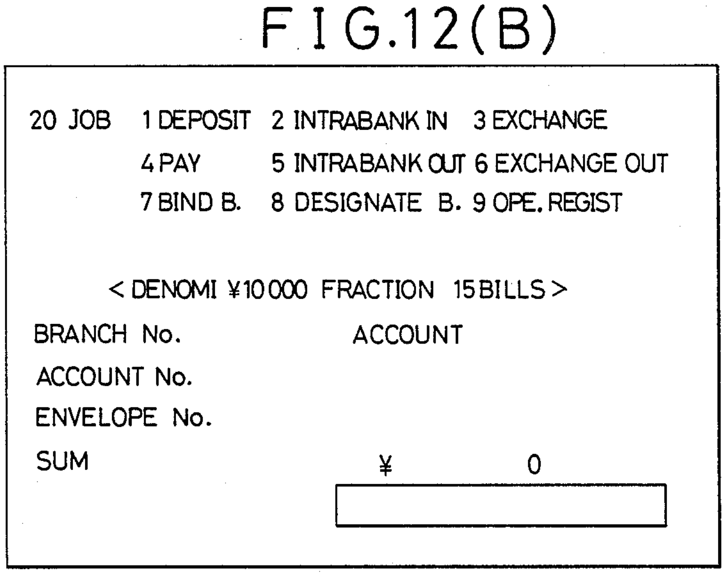
Figure 12C:
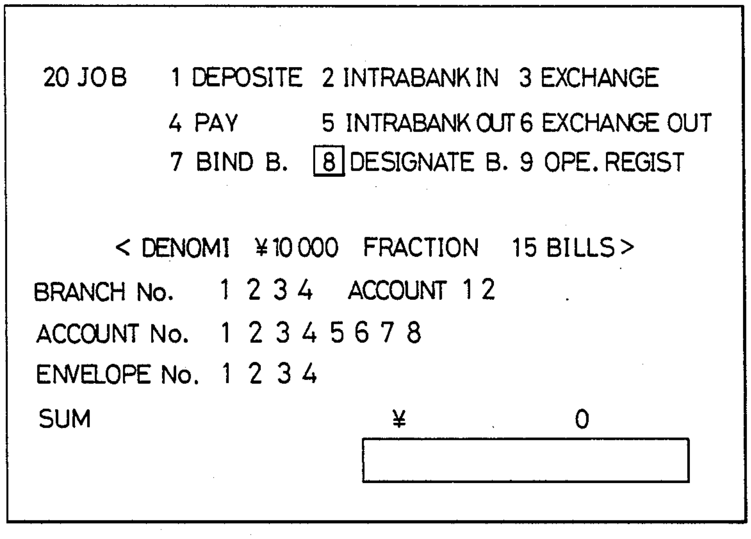
Figure 13:
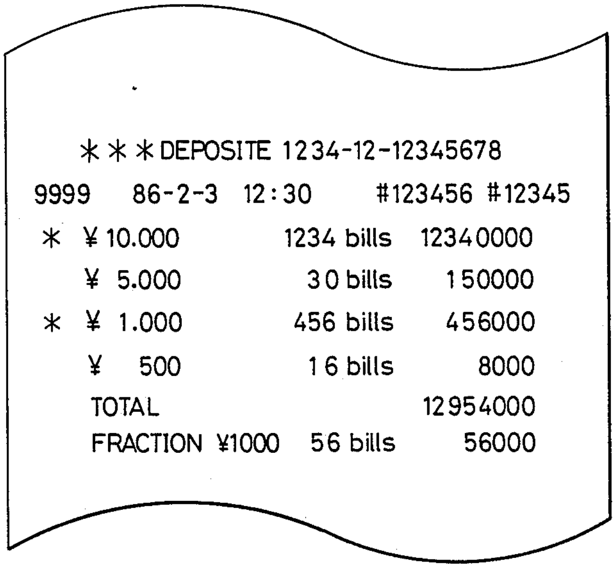
FIG. 13 is an example of data printed out by the printer of the system according to the present invention.

With reference to FIGS. 11 to 13, the operation of the bundler including a bill handling system according to the present invention will be described hereinbelow, which is the primary feature of the present invention.

An operator sets the mode selector switch 91 (FIG. 4) to OPERATOR MODE (in step 1) to display an instruction as shown in FIG. 12(A) on the CRT display unit 82 (FIG. 2). In response to this displayed instruction, the operator enters an operator code number to obtain a display as shown in FIG. 12B. On this display, the operator enters a transaction number as shown in FIG. 12(C) by use of ten keys 94 (in step 2). Thereafter, the operator designates a denomination and the number of bills to be bundled by the bundler 2 by the denomination key group 95 (e.g. ¥10,000 key) as shown in FIG. 12(C) (in step 3). In FIGS. 12 (B) and (C), it should be noted that the number of bills remaining unbundled within the stacking chamber 21 in the previous transaction is displayed as "PRECEEDING FRACTION".

Under these conditions, the operator puts a plurality of arranged bills on the bill supplying portion 3 of the bill handling equipment 110 (in step 4) and pushes the start key 96 (in step 5). Then, the controller 84 (FIG. 3) discriminates whether the bill denomination to be bundled in the present transaction is the same as in the preceding transaction or not (step 6). If the bill denomination to bundle is different from that in the preceding transaction, the controller 84 checks whether bills of the preceding transaction remain within the stacking chamber 21 on the basis of the detection signals from the sensors 114 (FIG. 9) (in step 7). If bills in the preceding transaction remain (YES) in step 7, the controller 84 displays a guide or alarm as "BILLS REMAIN IN STACKING CHAMBER" on the CRT display unit 82 (in step 8).

As described above, when the bill denomination to be bundled is changed or different from the preceding one, the controller 84 checks whether there exist remaining bills within the stacking chamber. If remaining bills exist, this is indicated to the operator by a display or an alarm; thus, it is possible to prevent bills of the preceding transaction from being bundled together with bills of the present transaction.

If the controller 84 determines that no bills exist (in step 7), the controller 84 changes the bill denomination to be bundled and activates the bill handling equipment 110 to light up the start key 96 (in step 9). Further, if the controller 84 determines that the denomination is the same as of the preceding transaction, the controller 84 also activates the bill handling equipment 110 to light up the start key 96 (in FIG. 9).

Therefore, bills B are conveyed to the bill discriminating device 7 through the convey path 6 to discriminate the denomination, the genuiness or imitation, the degree of damage, the right surface of the bill, etc. The discriminated bills are conveyed and sorted into temporary storage sections 14*a* to 14*d* or stacked in the stacking chamber 21 (in step 9). In addition, signals indicative of denominations outputted from the bill discriminating device 7 are supplied to the controller 84 via the interface 88. The controller 84 counts the number of bills of each denomination on the basis of the denomination signals and stores the number of bills of each denomination in the RAM 87 (in step ST10).

Thereafter, when an addition of fraction a produced at the preceding transaction and the number of bills designated at the present transaction reaches a predetermined number (e.g. 100 bills) in the RAM 87, that is, when the number of bills within the stacking chamber 21 reaches 100, the controller 84 outputs a bundle command to the bundler unit 2 (in step 11).

In response to this command, the bundler unit 2 begins to effect the bundling operations, that is, a predetermined number of bills are bundled by a strip tape MT and some information as bank name, date, etc. are printed on the tape before being discharged through the bill bundle outlet 2*a* (FIG. 2) (in step 12). At this moment, the controller 84 stores the number of bundled and discharged bills in the RAM 87. Whenever the number of bills stacked within the stacking chamber 21 reaches 100, the above-mentioned operation are repeated (in step 12).

After the assortment of all the bills put together in the bill supplying portion 3 in one transaction has been completed (in step 14), the controller 84 turns off the start key 96, and indicates the counted value on the CRT display unit 82 (in step 15). If this display indicates a correct counted result, the operator pushes an end key (in step 16). On pushing the end key, bills stored in the temporary storage sections 14*a* to 14*d* are accommodated into the cash safes 15*a* to 15*d*.

On the other hand, the controller 84 indicates the number of bills remaining in the stacking chamber 21 without being bundled (because the number is less than 100 bills, for instance), in response to the depression of the end key, on the CRT display unit 82 as shown in FIGS. 12(B) and (C) as "FRACTION" (in step 17). In addition, data related to the present transaction (e.g. the number of bills inserted at the present transaction, the number of bills remaining in the stacking chamber 21, etc.) are printed out by the printer 83 (FIG. 2), as depicted in FIG. 13 (in step 18). The controller 84 can read the number of bills each sorted and counted and the sum total thereof, and add these data stored in the memory unit 85 to obtain totalized data (in step 19).

As described above, in the bundler including a bill handling system according to the present invention, since the number of bills remaining in the stacking chamber 21 are counted, displayed and printed out, it is possible to continue the succeeding transaction without manually removing the remaining bills and without being subjected to a harmful influence of the remaining bills upon various sorting/counting operations in the succeeding transaction.

In the above description, only bills have been explained by way of example as the medium. However, the medium may be gift certificates, merchandise coupons, securities, etc. Further, the number of remaining bills are displayed on the CRT display; however, it is also possible to inform the operator of the remaining bills with a buzzer.

What is claimed is:

1. A bill sorting and bundling system for sorting a mixture of different denominations of bills respectively into a specified denomination and other denominations and bundling the specified denomination of bills, comprising:

(a) an input portion on which the mixture of different denominations of bills is placed;

(b) taking-in means for taking in a bill at a time from the bills placed on the input portion;

(c) detecting means for detecting the denomination of bills taken in by the taking-in means;

(d) specifying means for specifying said specified denomination of bills to be bundled;

(e) first conveying means for conveying bills detected by said detecting means to have the specified denomination;

(f) second conveying means for conveying bills which are detected by said detecting means not to have the specified denomination;

(g) guiding means for guiding the bills taken in by the take-in means to one of said first conveying means and said second conveying means in response to the detection by the detecting means;

(h) first collecting means for collecting the bills conveyed from said first conveying means;

(i) second collecting means for collecting the bills conveyed from said second conveying means;

(j) bundling means for bundling a predetermined number of the bills collected by said first collecting means;

(k) means for detecting an end of the sorting of said mixture of different denominations of bills;

(l) means for counting a number of bills collected by said first collecting means;

(m) means for detecting the number of bills remaining unbundled at said first collecting means in accordance with said counting means when said detecting means detects the end of the sorting of said mixture of different denominations of bills; and (n) means for indicating the detected number of bills remaining unbundled by said bundling means.

2. The system according to claim 1, wherein said indicating means comprises a display unit for displaying the number of bills remaining unbundled at the first collecting means.

3. The system according to claim 1, wherein said indicating means comprises a printer for printing the number of bills remaining unbundled at said first collecting means.

4. A method of continually bundling bills of a predetermined number having the same predetermined denomination in a bill sorting and bundling system for sorting a mixture of different denominations of bills respectively into the predetermined denomination and other denominations and bundling the predetermined denomination of bills, comprising the steps of;

(a) specifying the predetermined denomination of bills to be bundled;

(b) checking whether the predetermined bill denomination is the same as that of a preceding bill bundling operation;

(c) if the predetermined bill denomination is not the same denomination as the denomination of the preceding bill bundling operation, checking whether unbundled bills remain from the preceding bill bundling operation;

(d) if bills remain from the preceding bill bundling operation, indicating to a user that unbundled bills remain, so that the remaining unbundled bills may be manually removed; and (e) if the predetermined bill denomination is the same denomination as the denomination of the preceding bill bundling operation in step (b), or if the predetermined bill denomination is not the same as the denomination of the preceding bundling operation in step (b) but unbundled bills from the preceding bundling operation are not remaining in step (c), executing a sorting and bundling operation of said mixture of different denominations of bills.

5. The method of claim 4 comprising the further steps of:

(f) storing the number of bills of each denomination of said mixture of different denominations of bills into a memory unit;

(g) determining a predetermined number of bills to be bundled;

(h) bundling bills of the predetermined number and the predetermined denomination;

(i) checking for an end of the bill sorting operation and outputting a sorting operation end signal;

(j) displaying the number of sorted bills of each denomination in response to the sorting operation end signal;

(k) displaying in response to the sorting operation end signal the number of bills remaining unbundled; and (l) storing the total of the number of sorted bills of each denomination and the number of bills of said predetermined denomination remaining unbundled into the memory unit.

6. A method of continually bundling bills of a predetermined number having the same predetermined denomination by a bundler including a bill handling system, comprising the steps of:

(a) designating a denomination of bills to be bundled;

(b) counting the number of bills of the designated denomination;

(c) bundling the designated denomination of bills into bundles having the predetermined number of bills;

(d) generating an end signal indicative of the end of the bill bundling step (c);

(e) temporarily storing a number of bills of the designated denomination remaining unbundled after said bill bundling step (c); and (f) indicating the number of bills bundled at bill bundling step (c) and the number of bills remaining unbundled after bill bundling step (c).

* * * * *